United States Patent [19]

Ryan

[11] Patent Number: 4,798,802
[45] Date of Patent: Jan. 17, 1989

[54] METHOD FOR ACCELERATING COMPOSTING OF ORGANIC MATTER AND COMPOSTING REACTOR THEREFOR

[76] Inventor: Richard M. Ryan, 37 Fairway Dr., Southgate, Ky. 41071

[21] Appl. No.: 78,567

[22] Filed: Jul. 28, 1987

[51] U.S. Cl.[4] .......................................... C12M 1/00
[52] U.S. Cl. .................... 435/313; 435/287; 435/315; 71/9; 422/184; 198/550.01; 198/750; 198/775; 414/525.9
[58] Field of Search .............. 435/287, 313, 315; 366/107; 414/525 B; 198/550.01, 750, 775; 71/9; 210/271; 422/184

[56] References Cited

U.S. PATENT DOCUMENTS

| 3,357,812 | 12/1967 | Snell | 71/9 |
|---|---|---|---|
| 4,143,760 | 3/1979 | Hallstrom | 198/750 |
| 4,144,963 | 3/1979 | Hallstrom | 198/750 |
| 4,184,587 | 1/1980 | Hallstrom | 198/750 |
| 4,436,817 | 3/1984 | Nemetz | 435/313 |
| 4,474,285 | 10/1984 | Feeter | 198/790 |

FOREIGN PATENT DOCUMENTS 42192  9/1985  Japan ................................ 435/313

OTHER PUBLICATIONS

"Keith Walking Floor" brochure, Keith Manufacturing Company, Madras, Ore., 97741.
"Walking Floor Bunker" brochure, Keith Manufacturing Company, Madras, Ore. 97741.
"BAV Tunnel Reactor" brochure, American Bioreactor Corporation, P.O. Box 142, Fryeburg, Ma. 04037
"Tunnel Reactor" brochure, Biologische Abfallverwertungs-Gesellschaft mbH Et Co., Berliner Strasse 22, 6369 Schoneck, Hessen 1.

Primary Examiner—Samuel Scott
Assistant Examiner—Noah Kamen
Attorney, Agent, or Firm—Frost & Jacobs

[57] ABSTRACT

A plug-flow composting reactor including a longitudinal hollow chamber having a floor, a pair of oppositely disposed side walls, and a top wall. The reactor preferably includes an entrance structure and an exit structure mounted at opposite ends of the hollow chamber to thereby substantially close the reactor when desired. The floor of the chamber further includes a plurality of longitudinal slats slidably mounted for longitudinal reciprocation relative the side and top walls. The slats are located in parallel relationship to one another along the chamber, with adjacent slats preferably laterally spaced from one another by interposed aeration conduits. These aeration conduits provide aeration gases to the organic matter within the reactor. Vents for exhausting the aeration gases from the chamber are provided to ensure a predetermined flow of such gases through the chamber. Fluid pressure driven reciprocation cylinders are preferably provided to selectively, longitudinally reciprocate the adjacent slats within the chamber to thereby impose movement of organic matter through the reactor without substantially longitudinally compressing the same.

29 Claims, 8 Drawing Sheets

METHOD FOR ACCELERATING COMPOSTING OF ORGANIC MATTER AND COMPOSTING REACTOR THEREFOR

TECHNICAL FIELD

The present invention relates to a composting reactor for accelerating the composting of organic matter, and, more particularly, to a horizontal, plug-flow composting reactor having a floor system with a plurality of reciprocable, laterally spaced slats for selectively progressing the organic matter through the composting reactor while controling aeration thereof to accelerate the composting of the organic matter.

BACKGROUND ART

Horizontal, plug-flow reactors for composting organic wastes are available from various sources in the industry and are employed to compost organic wastes into humus-like material. Typically in plug-flow reactor units currently available in the industry, organic material to be composted is transferred by conveyor belt or the like to a feed compartment at the front or entrance of a tunnel reactor. When this feed compartment is filled, a hydraulically operated plate or ram pushes the contents of the feed compartment into the reactor. The hydraulic ram thereafter returns to its original position to be refilled with additional organic matter from the conveyor system. Repeated filling and pushing serves to seqwentially convey the organic matter through the reactor.

Air is injected into the organic matter within the reactor through various ducts which can be individually controlled. From start to finish, the organic matter is pushed horizontally by the ram, and aerated by this injection process. Generally in these composting reactors, apart from being longitudinally pushed by the hydraulic ram, and the injection of air into the system as desired, the organic wastes being pushed through the reactor remain substantially undisturbed throughout the process. Generally too, these "tunnel-type" reactors contain no moving parts other than the hydraulic ram system. The composted organic matter is removed at the rearward end of the reactor by conveyor or the like, and this partially composted mixture is then transported to a holding or maturation area where, after four to six weeks, it can be delumped and seived. Thereafter, the compost is stabilized and ready for use for soil conditioning and the like.

While these "tunnel-type" reactors are quite useful in accelerating the composting of organic wastes, they are inherently inefficient due to their very nature. In particular, it is imperative in accelerating the composting of organic wastes to provide sufficient aeration to enable and augment the aerobic activity of microorganisms therewithin essential for the composting process. The hydraulic ram mechanism of the "tunnel" reactor systems available in the industry tends to compact the organic matter as it pushes the same through the reactor. Such compaction substantially limits the capability of aerating the organic matter properly. Without proper aeration, the composting process is inhibited, and optimum composting cannot be achieved. It is important in optimizing the composting reaction that the bioculture within the organic matter be constantly exposed to new organic food sources. Undisturbed organic matter does not compost efficiently because the biocultures are not being moved and exposed to such new sources of food.

Moreover, the use of the hydraulic ram device to progress the organic matter through the system depends upon the availability and addition of more organic matter to the system. It is conceivable that the availability of organic matter, and/or the mechanical reliability of the hydraulic ram device, could have an adverse effect on the uniformity and predictability of the movement of the material through the reactor and the resultant dwell or residence time therewithin. Obviously, varying processing temperatures, time and movement characteristics of the organic matter within the reaction system can effect the quality, uniformity and performance of the system and its end product.

Consequently, there remain problems in the industry in providing a continuous composting reaction process and system which can provide consistent and reliable performance. Heretofore, there has not been available a continuous process for accelerating the composting of organic matter, or a system which can accomplish such process, in a relatively simple, reliable and efficient manner.

In other industries, various conveyor systems have been utilized in a number of ways to unload or otherwise transfer goods from one place to another. For example, U.S. Pat. No. 4,143,760, which issued to O. Hallstrom on Mar. 13, 1979, concerns a reciprocating conveyor having a plurality of elongated slats mounted side-by-side and connected to a fluid pressure drive mechanism. The Hallstrom drive mechanism moves all of the slats from a start position in a load-conveying direction to transfer materials, and then sequentially moves the slats in the opposite direction back to their start position to prepare for another load-conveying movement.

The slat-type conveyors, as set forth in the Hallstrom U.S. Pat. No. 4,143,760, and related U.S. Pat. Nos. 4,144,963, 4,184,587 and 4,474,285, provide means for unloading trucks and similar containers, as well as generally transporting materials; however, they are not designed or are they capable of providing a plug-flow reactor structure necessary for composting organic matter and, consequently, have never been employed for such purpose heretofore. The subject invention incorporates this sequencing conveyor concept within a unique plug-flow reactor apparatus and method for composting organic matter to address the problems set forth above in providing an improved continuous composting reaction process and system.

DISCLOSURE OF THE INVENTION

It is an object of this invention to obviate the above-described problems.

It is another object of the present invention to provide a more efficient composting reaction system and process for treating organic wastes.

It is yet another object of the present invention to provide a more efficient continuous composting process and system which features enhanced versatility and adjustability for application to a variety of organic waste treatment needs.

In accordance with one aspect of the present invention, there is provided a plug-flow composting reactor including a longitudinal hollow reactor chamber having a floor, a pair of oppositely disposed side walls, and a top wall. The reactor further includes an entrance structure and an exit structure mounted at opposite ends of the hollow reactor to thereby substantially close such reactor when desired. The floor of the reactor includes a plurality of longitudinal slats slidably mounted for longitudinal reciprocation relative the side and top walls of the reactor. The slats are located in parallel relationship to one another along the length of the reactor, with adjacent slats being laterally spaced apart by interposed aeration conduits. These aeration conduits provide aeration gases to the organic matter within the reactor. Exhaust vents for exhausting the aeration gases from the reactor are provided to ensure a predetermined flow of such gases therethrough. Fluid pressure driven reciprocation cylinders are preferably provided to selectively, longitudinally reciprocate the adjacent slats within the reactor to thereby impose progressive movement of organic matter through the reactor without substantially longitudinally compressing the same.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIG. 1A is a partial plan view of the feed hopper and leveling screw device shown in FIG. 1;

DETAILED DESCRIPTION OF THE INVENTION

Figure 1:
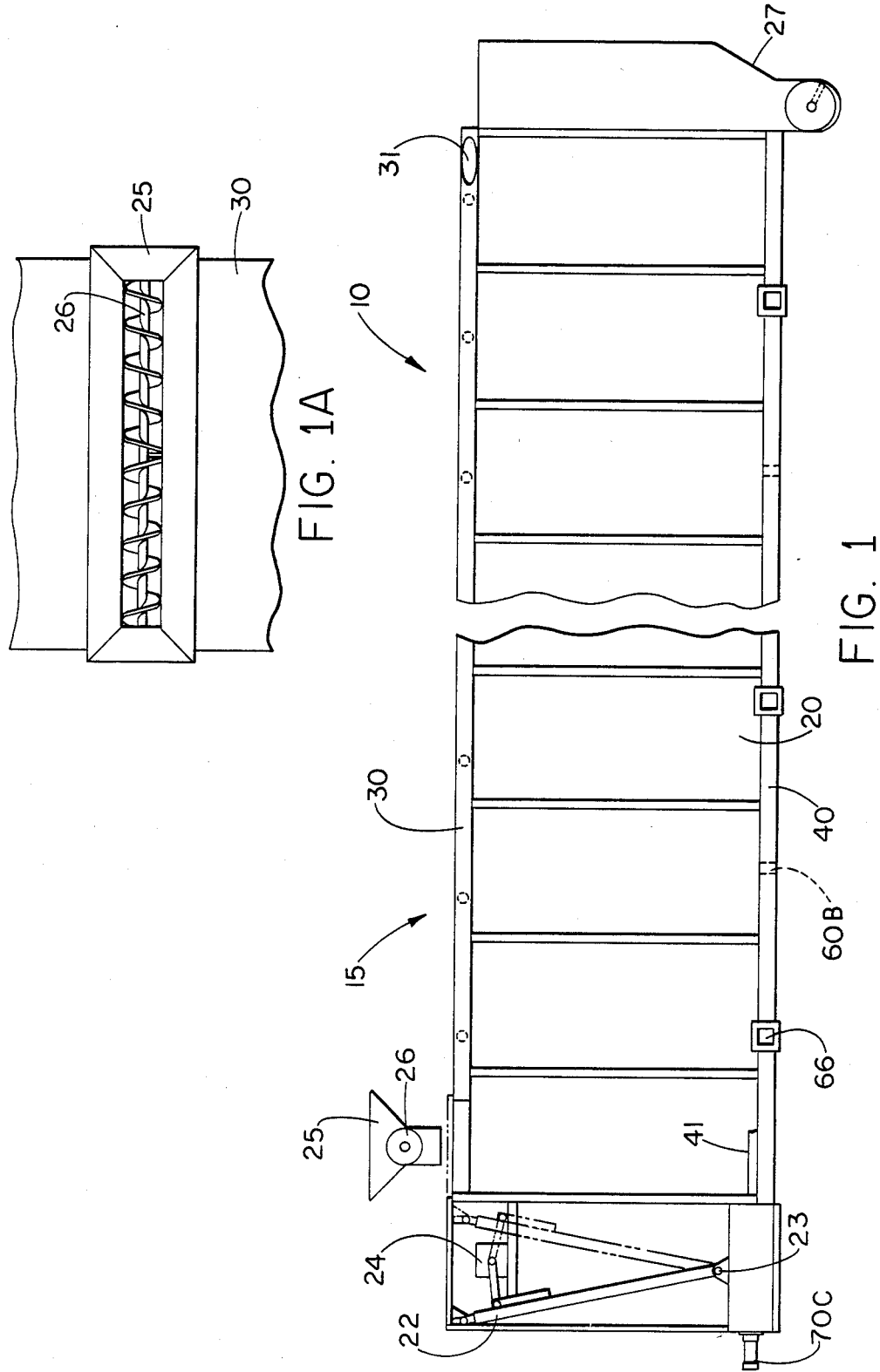
FIG. 1 is a longitudinal elevational view of a composting reactor made in accordance with the subject invention.
Figure 2:
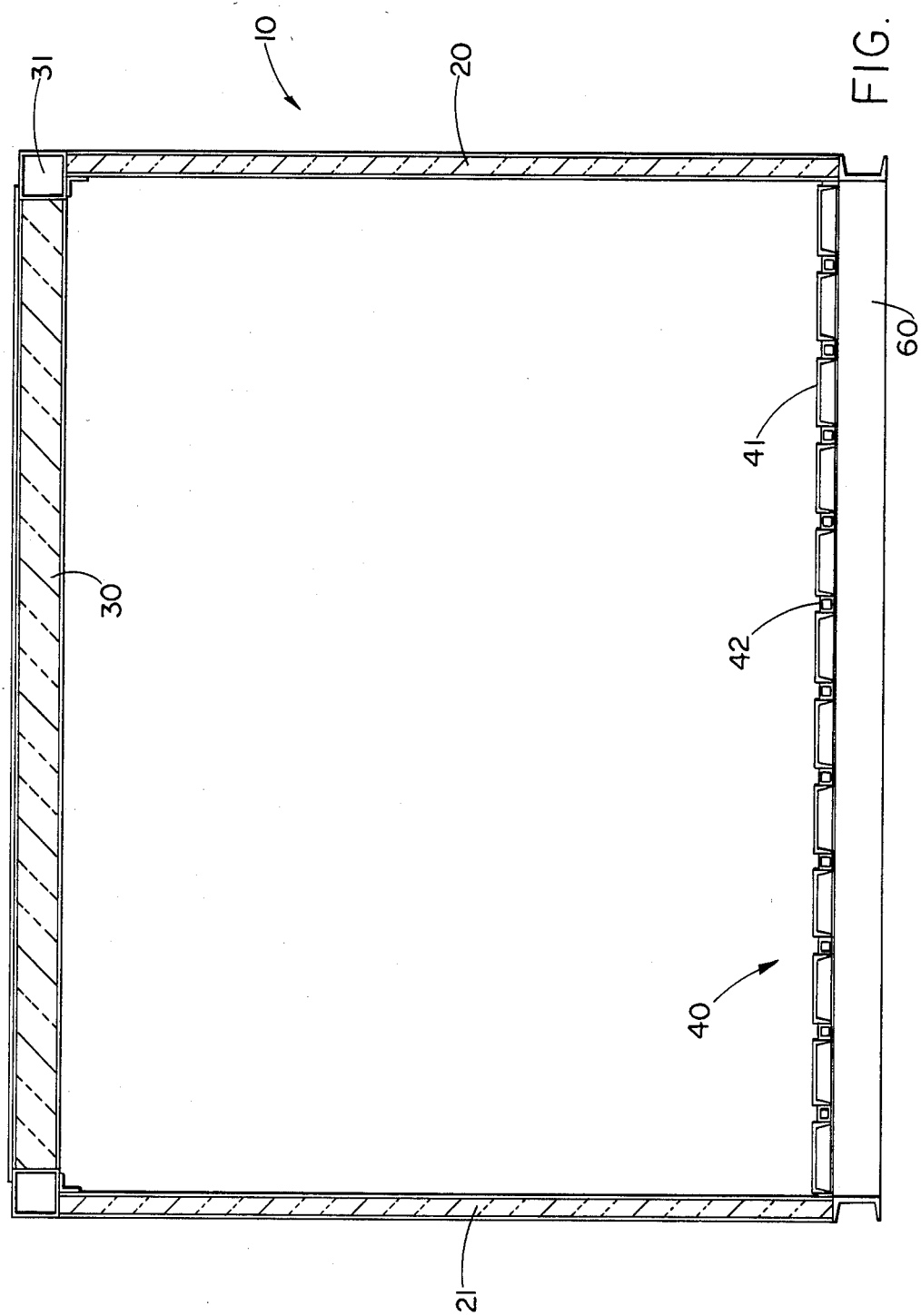
FIG. 2 is a cross-sectional view of the composting reactor of FIG. 1.

Referring now to the drawings in detail, wherein like numerals indicate the same elements throughout the views, FIGS. 1 and 2 illustrate a plug-flow composting reactor 10 made in accordance with the subject invention. While the reactors of the present invention are illustrated and described as preferably oriented substantially horizontally, such as not critical and may not be so in all applications. The term "plug-flow" is used to signify that organic matter substantially fills the chamber of the subject reactor and is moved through such chamber uniformly in "plug" form. In particular, composting reactor 10 comprises a substantially hollow reactor chamber 15 having a floor 40, a top wall 30, and oppositely disposed front and rear side walls 20 and 21, respectively. For environmental cleanliness and safety, as well as to confine aeration gases within the reactor, it is preferred that an entrance structure 22 and an exit structure 27 be provided at opposite ends of chamber 15 to thereby substantially close the reactor during processing, as desired. In this regard, FIG. 1 illustrates an entrance structure 22, which preferably also serves as a feed closure door for the system.

It is preferred that feed closure door 22 be provided with a hydraulic door actuator 24 in order to provide a means for allowing organic matter which has been supplied to the entrance of the tunnel 15 thereinto. As used herein, the term organic "waste" will be utilized interchangeably with the term organic "matter". While organic matter which is composed is generally waste material in that it often is an unwanted by-product from some other process, any organic matter can be composted utilizing the subject invention.

Figure 8:
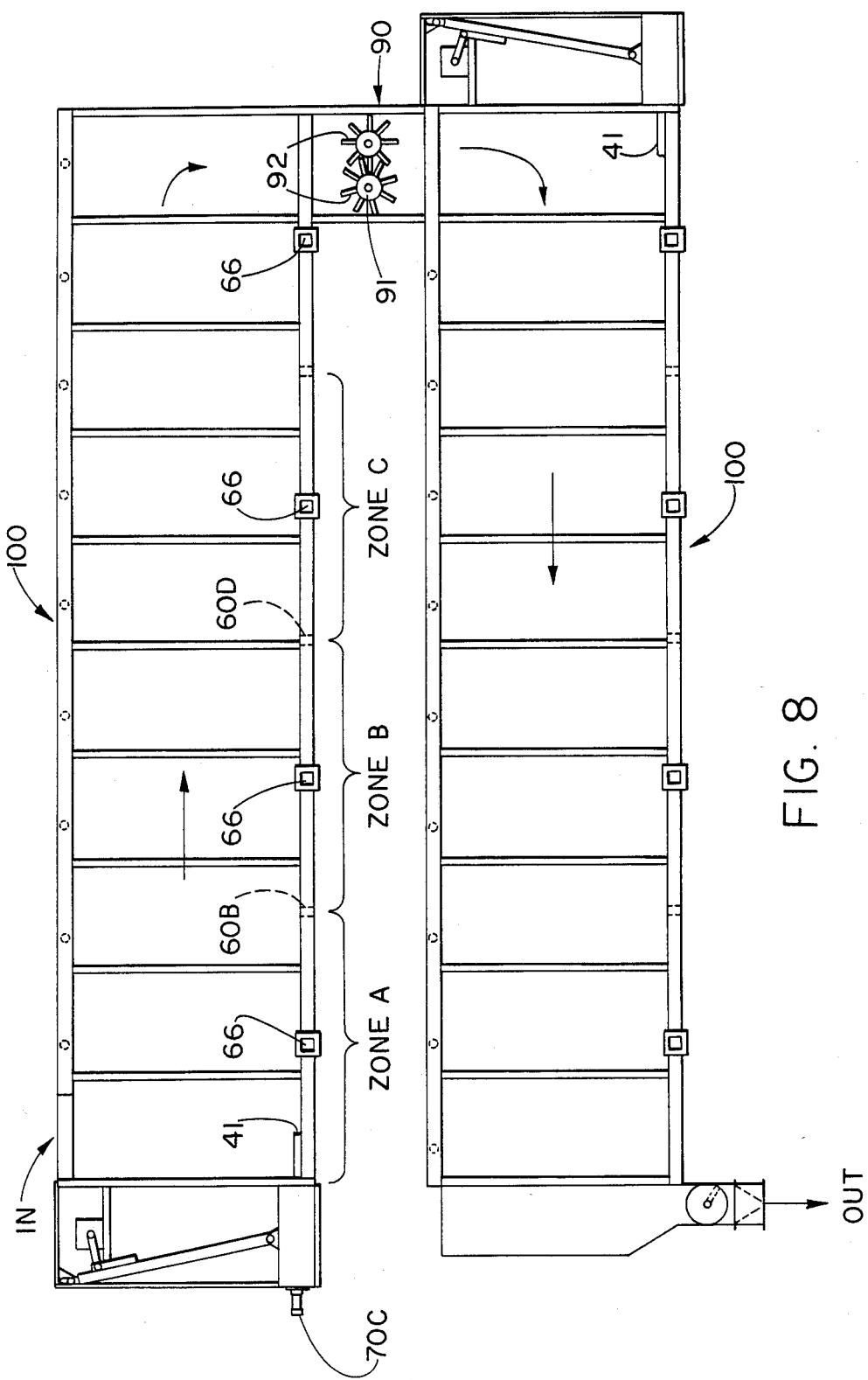
FIG. 8 is a schematic view of an alternate embodiment of the composting reactor of the subject invention.

Feed closure door 22 is shown as being slidingly mounted for movement between opened and closed positions. Closure door 22 is shown as being reciprocated by the pivotally mounted arm 23. A similar door structure can also be provided as the exit door structure 27 at the opposite end of composting reactor 10, such as by hinged mountings or the like. The reactor contents can be discharged through the exit structure 27 by free fall or by means of a discharge screw or other conveyance means (e.g. discharge screw 27 shown in FIG. 1, while drop gate or free fall means are shown in FIG. 8). The exit structure is sealed by means of a door, gate or slide valve which can be manually or automatically actuated. Sealing of both the feed and exit also serves to prevent uncontrolled discharge of process air from the reactor.

Side walls 20 and 21, and top wall 30, are preferably made of steel, concrete or some other similar rigid material which is substantially impermeable to fluids. These structures must feature strength sufficient to support the stresses and strains imposed upon the structure by the waste material being processed therewithin. The side walls 20 and 21, and top wall 30 may be insulated to better control temperatures and energy requirements of reactor 10 (e.g. see FIG. 2). As also illustrated in FIG. 2, it is contemplated that the organic matter will substantially fill the interior portions of chamber 15, although as will become more apparent below, it is preferred that some space remain below the top wall 30 to facilitate circulation of aeration gases therewithin. Organic matter is preferably fed into chamber 15 via feed hopper 25, whereby substantially even and complete filling of chamber 15 across its width and depth is facilitated by a leveling means, such as leveling screw 26. As will be seen in further detail below, it is important to insure uniform and complete filling of chamber 15 because aeration gases follow the path of least resistance toward the exhaust duct (e.g. 31), and partial filling would provide voids through which aeration gases could easily pass, reducing the aeration effects on the organic matter.

Floor 40 of chamber 15 further comprises a plurality of longitudinal slats 41 which are slidably mounted for longitudinal reciprocation relative the side walls 20 and 21, and top wall 30. Particularly, slats 41 preferably comprise U-shaped channel structures made of steel, metal alloy, or similar rigid materials. Slats 41 are arranged in longitudinal parallel relationship with respect to one another along the length of chamber 15, with adjacent slats being laterally spaced from one another by interposed air headers 42. Air headers 42 are illustrated as a preferred means for providing aeration gases to the interior of chamber 15, and for effectively separating adjacent slats 41. Slats 41 and air headers 42 surmount a substantially planar deck substrate or plate 43. It is preferred that deck substrate or plate 43 be formed of plate steel (e.g. approximately 0.25 inches in thickness) or similar rigid material to support the reciprocating slats and aeration means thereabove. Deck plate 43 is supported from below by a series of longitudinally spaced, laterally extending structural support beams 60.

Figure 3:
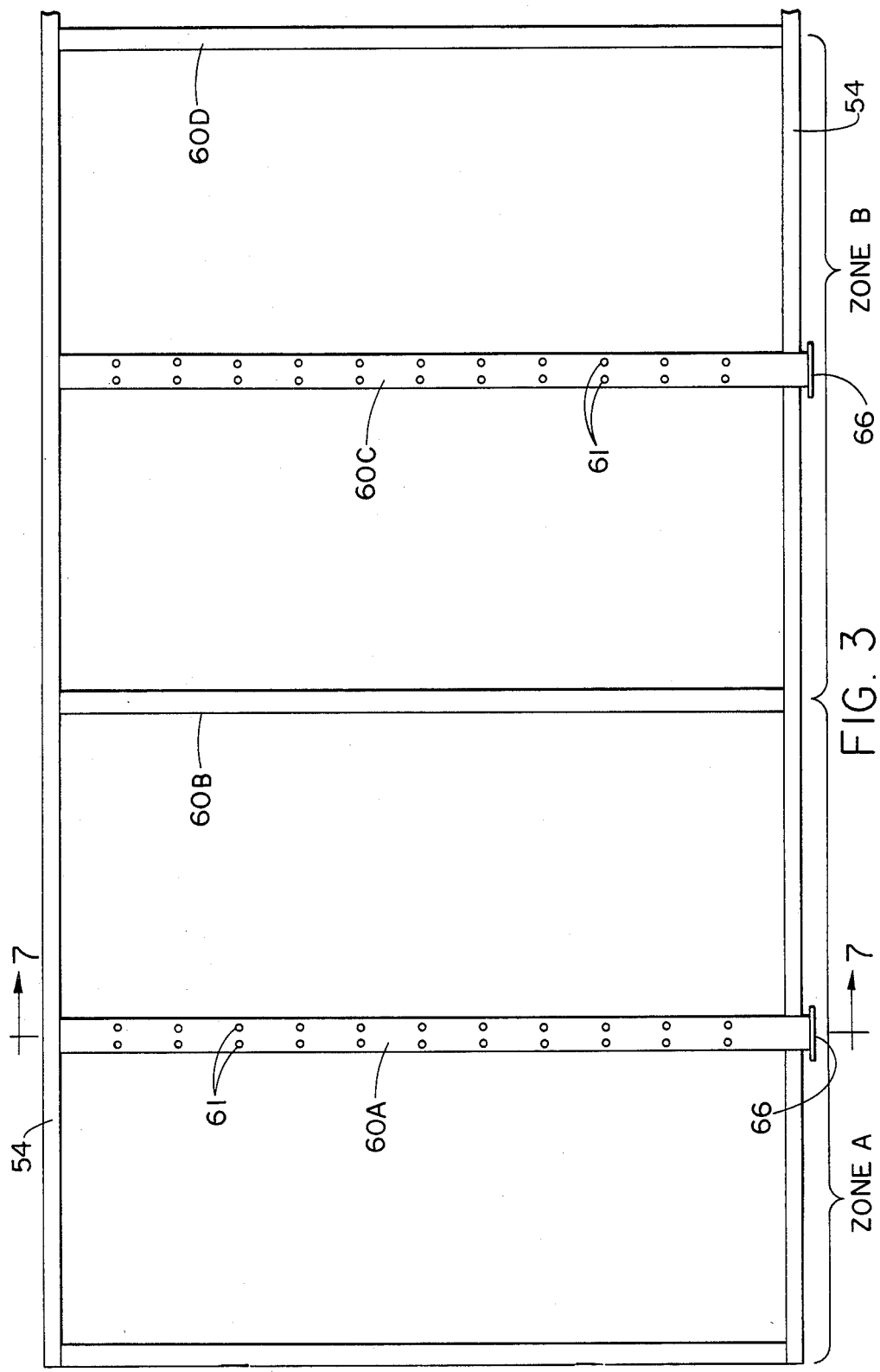
FIG. 3 is a top plan view of the underlying support structure for the floor of the composting reactor of FIG. 1.

FIG. 3 illustrates a top plan view of the structural support system of floor 40. In this regard, the structural support system shown in FIG. 3 supports deck plate 43, as described above. In particular, the outer periphery of deck plate 43 is preferably supported by a steel channel 54 having sufficient dimensions and strength as required in a specific application. A plurality of structural support beams 60 extend laterally beneath deck plate 43 between the opposite channels 54 extending longitudinally along the length of reactor 10.

It is preferred that at least some of these structural support beams 60 be of a tubular design in order to provide the dual function of both support and means for supplying aeration to chamber 15. In particular, it is contemplated that a preferred aeration supply system could be provided by making at least some of the structural support beams 60 hollow aeration supply conduits which could be placed in fluid communication with the longitudinally extending air headers 42.

FIG. 3 illustrates an application where alternating structural support beams 60 have been formed as aeration supply conduits. For example, structural support beam 60A has been formed as a hollow supply conduit having aeration supply holes 61 formed in its upper surface. Support beam 60A further includes an air inlet flange 66 to connect this effective aeration supply conduit to an appropriate source of compressed aeration gases (not shown). Support beams 60C has similarly been formed as an aeration supply conduit having a plurality of aeration supply holes formed in its upper surface. It is contemplated that aeration supply conduit 60C would also be connected by an inlet flange 66 to a source of compressed aeration gases, as desired. It is preferred that the characteristics and quantity of the aeration gases supplied to these individual supply conduits can be independently controlled, as will be described in greater detail below, to effectively create zones within composting reactor 10 having varying temperatures, humidities, and rate of air flow therewithin.

Figure 4:
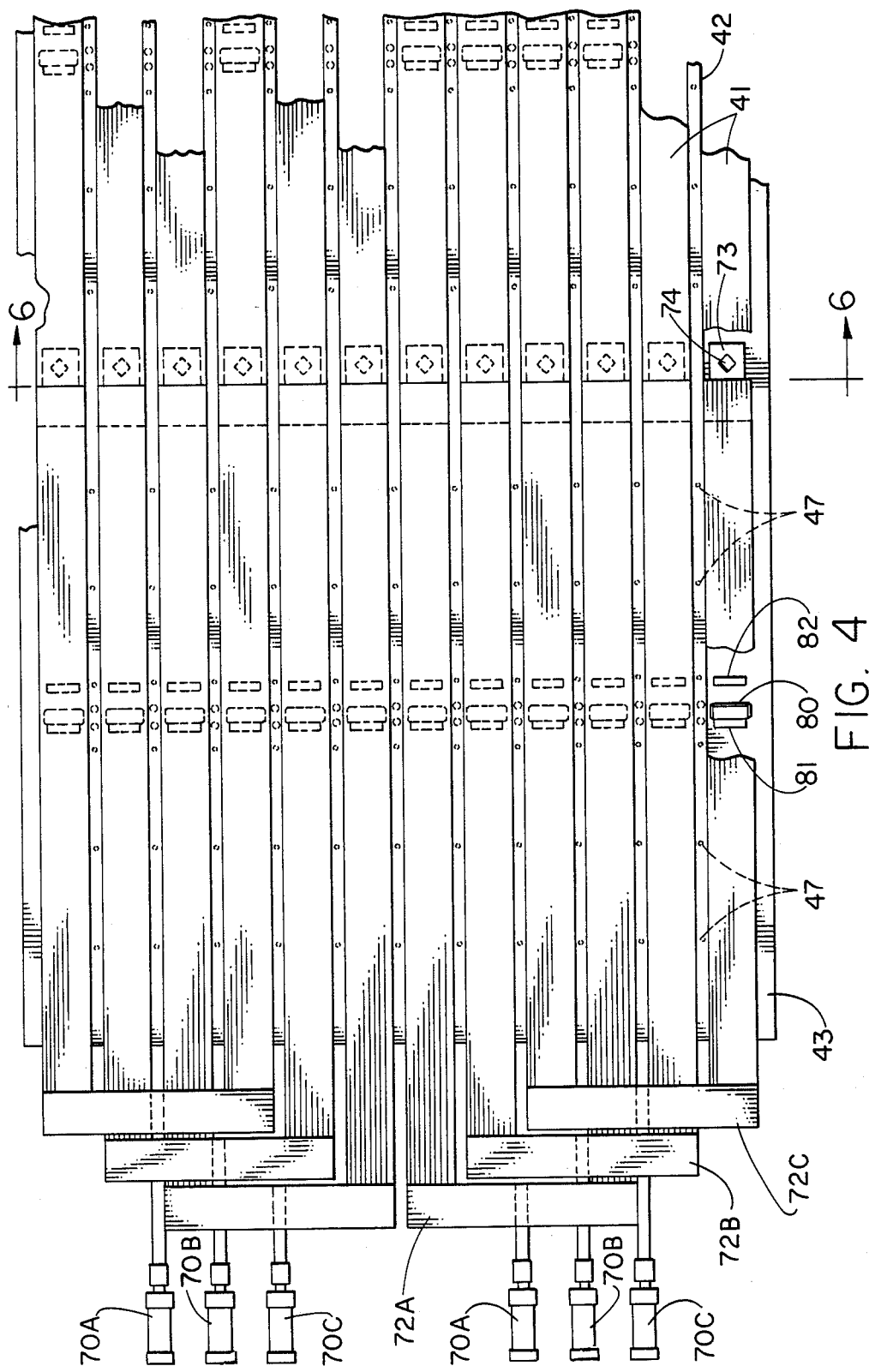
FIG. 4 is a top plan view of the floor of the composting reactor of FIG. 1, illustrating the laterally spaced longitudinal slats and the interposed aeration conduits.
Figure 5:
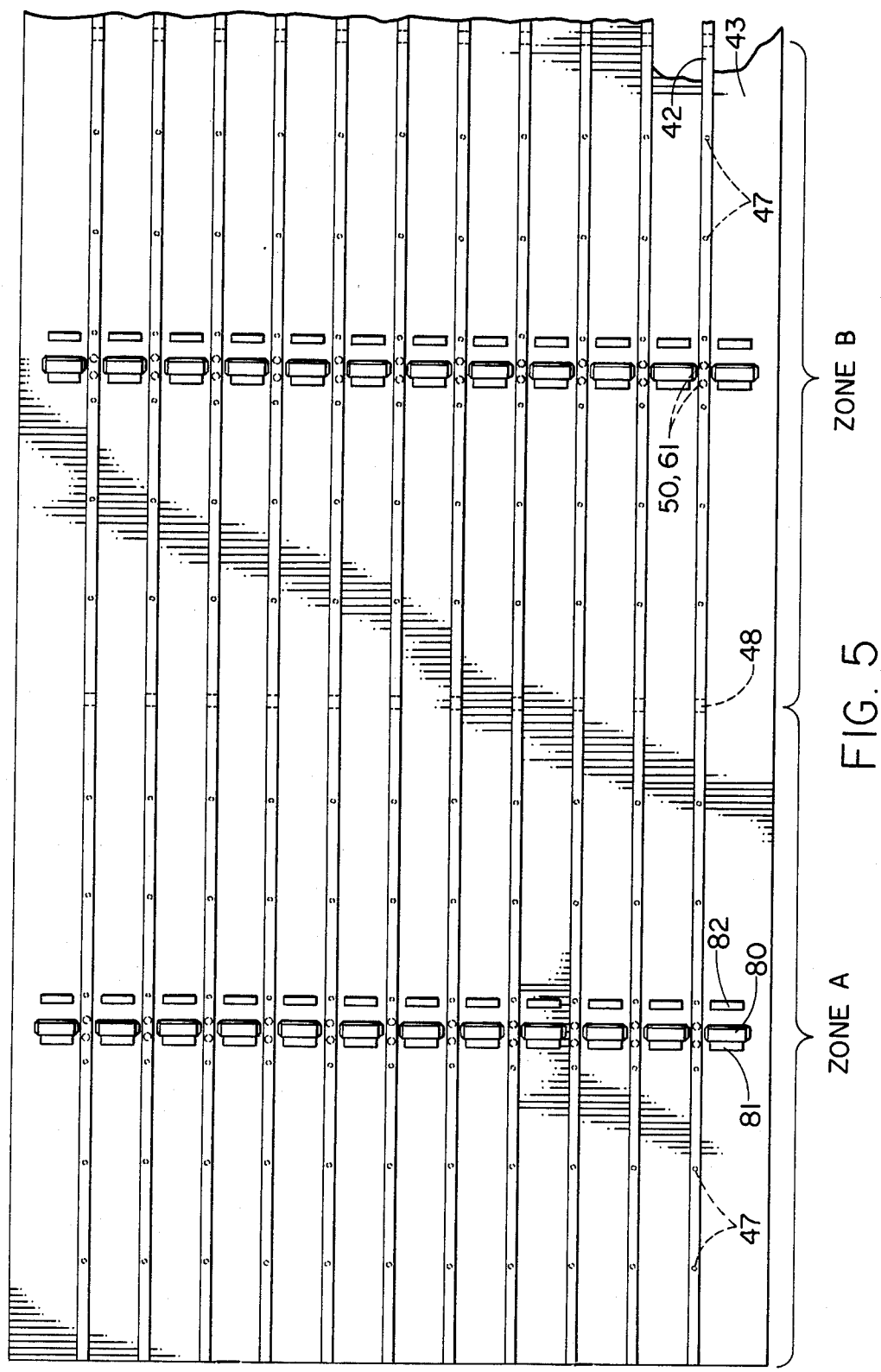
FIG. 5 is a top plan view of a preferred roller support system and interposed aeration system of the composting reactor of FIG. 1.

FIGS. 4 and 5 are further top plan views of floor 40 of reactor 10 illustrating various additional details of the structure of the reciprocable slats 41 and the interposed aeration headers 42. Particularly, FIG. 4 illustrates a preferred embodiment of the arrangement of reciprocable slats 41 and the associated means (i.e. cylinders 70A-70C) for selectively longitudinally reciprocating slats 41 within chamber 15 to impose progressive movement of organic wastes within reactor 10. It is preferred that means for longitudinally reciprocating slats 41 be fluid pressure (e.g. hydraulic or pneumatic) operated cylinders 70A-70C, as illustrated. As shown in FIG. 4, it is contemplated that cylinders 70A-70C will each be connected to a plurality of slats 41 in a staggered relationship such that all of the cylinders can be operated simultaneously to reciprocate all of the slats 41 in the forward direction to longitudinally move the organic waste within chamber 15 toward the exit structure 27; while following such forward movement stroke, individual cylinders can be actuated to retract the various slats sequentially such that only one of any three adjacent slats is being retracted at any given time. By selectively retracting only one-third of the slats at any given time, the bulk of the organic wastes within chamber 15 is not effected, and there is no substantial movement of the organic waste in the direction of retraction within chamber 15. After all of the slats have been retracted to their original positions, all of the cylinders again force all of the slats 41 toward the exit structure 27. In this way a selectively controlled, progressive movement of the organic waste material within chamber 15 is accomplished. Such movement can be substantially continuous or intermittent, as desired.

It is contemplated that for the purposes of a large-scale composting reactor such as illustrated herein, the speeds of reciprocation of slats 41 and of the resulting progressive movement of the organic wastes within chamber 15 will be relatively slow (e.g. perhaps two feet per hour). While the size and number of fluid pressure driven cylinders necessary to accomplish the reciprocation described above may vary between specific applications based upon desired reciprocation speed, length of slats 41 and chamber 15, and volume of organic waste to be processed, the relatively slow speeds at which the composting organic material is to be moved within the system generally requires relatively low horsepower. It is preferred, however, to provide cylinders with variable speed control to provide versatility to the system. For example, it might be desirable to have the ability to empty out a particular reactor at any given time at a relatively rapid speed for safety concerns, cleaning, or for repair of the system. In this way, a composting reactor which might normally take 12 to 14 hours to unload its contents in normal course might be speeded up to empty its contents in a few (e.g. 3 or 4) hours, thereby reducing machine down time or the like. The unique transport system of the subject invention also provides the capability of unloading or emptying the reactor without a need for extraneous equipment such as digging machines and the like commonly required with reactors known heretofore.

It is contemplated that in order for a single fluid pressure slat reciprocation cylinder to control a plurality of slats 41, each of such cylinders can be connected to a plurality of slats 41 with appropriate slat drive cross-ties (as shown at 72A-C of FIG. 4). as seen in the side elevation of FIG. 1, the slat drive cross-ties 72A-C could preferably be formed of steel channels which serve to rigidly connect the particular slats to be controlled by an individual cylinder 70. While each slat 41 could, of course, be individually controlled by its own fluid pressure cylinder, it is preferred for economy and efficiency to reciprocate a plurality of slats with each cylinder as shown and described herein. As also shown in FIG. 4, each individual slat 41 may comprise a plurality of slat sections integrally connected end to end in any convenient manner. A preferred manner of interlocking the individual slat sections may be as shown in FIG. 4, comprising a plate 73/screw 45 arrangement. Such interlocking could also be accomplished or augmented by the use of an intermeshing protuberance/slot arrangement or similar mechanical interlocking setup. For example, rectangular slots 74 are illustrated in FIG. 4 as being formed in plates 73 for locking interaction with downwardly depending corresponding protuberances (not shown) of individual slats 41 to be connected.

Figure 7:
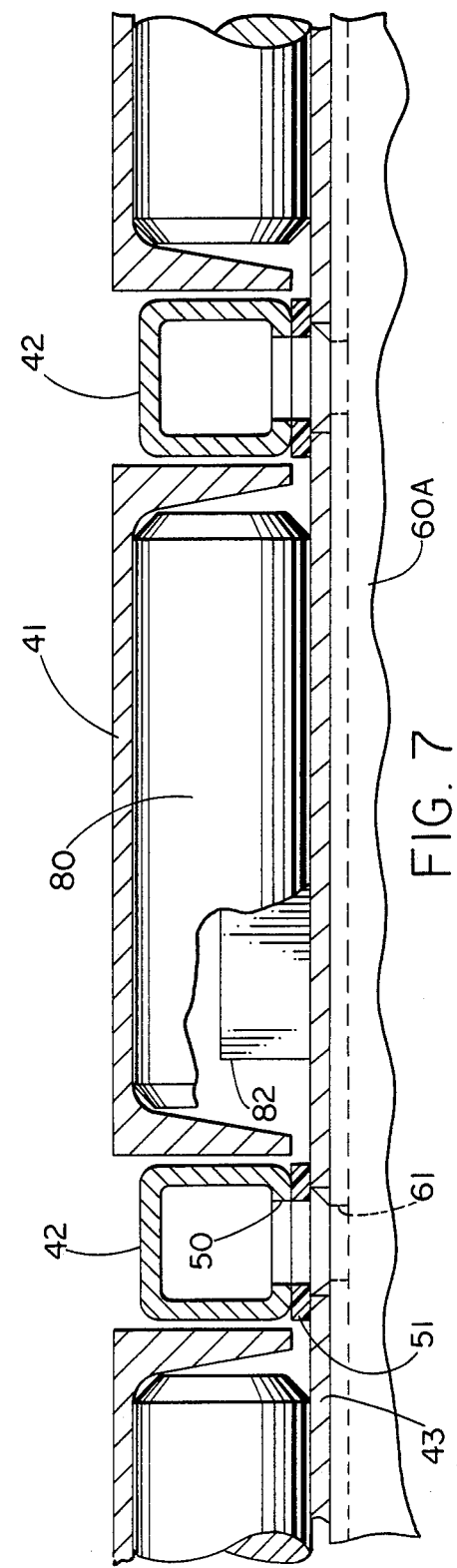
FIG. 7 is an enlarged cross-sectional view of the floor portion of the composting reactor taken through a lateral structural support beam (e.g. 60A) thereof.

As mentioned, slats 41 are to be slidably mounted for longitudinal reciprocation relative chamber 15. While the stroke distance of reciprocating slats 41 can vary depending on the application, it is contemplated that a preferred stroke length might be in a range of between about 3 to 6 inches. While it is contemplated that slats 41 could be designed to simply slide along deck plate 43 on a friction bearing, or within grooves or the like; in order to reduce friction and to optimize energy requirements of the system, it is preferred that slats 41 be slidably supported on deck plate 43 by one or more roller structures. A preferred roller support arrangement is illustrated in FIGS. 4, 5 and 7 as including a substantially free rolling roller 80 to be contained under the channel structure of an individual slat 41 and within a pair of longitudinally spaced forward and rear roller stops 81 and 82, respectively. While the roller supports contemplated herein could equally be rollers supported on deck 43 by stationary axis/bearing structures (not shown), it is preferred to utilize the described free-rolling roller 80 arrangment to minimize frictional forces and maintenance. Roller 80 could be formed of either a hollow or solid piece of relatively rigid material, such as steel or plastic or the like, as can be roller stops 81 and 82. Roller stops 81 and 82 are connected to the upper surface of deck plate 43 by any convenient means, and serve as defining limits for the longitudinal rolling movement of a particular roller 80. The undersurface of the U-shaped slat 41 provides a longitudinal race within which roller 80 is confined. As shown in FIG. 5, a plurality of roller and roller/stop arrangements are preferably spaced throughout the length of each individual slat 41, and the number and spacing of such roller/stop arrangements can be varied as desired.

FIG. 5 further illustrates additional details of preferred means for providing aeration gases within chamber 15. In particular, interposed between each adjacent slat 41 is a longitudinally extending air header 42. It is preferred that air headers 42 be formed of a hollow rectangular piece of tubular steel or the like, as best seen in FIGS. 2, 4, 6 and 7. While the shape, size and material from which air headers 42 are formed is not critical, it is preferred that air headers 42 have an exterior conformation which substantially corresponds to the lateral edges of the adjacent slats 41, and that such headers have sufficient strength and durability to withstand the stresses and pressures inherent in the composting reactor contemplated herein. It is also preferred that all of the materials utilized to construct the composting reactor 10 of the subject invention be standard materials and sizes to minimize cost and facilitate the manufacture, maintenance and replacement thereof. For example, standard square steel tubing can be utilized for air headers 42.

Air headers 42 are formed with spaced aeration inlet orifices 50 on their lower surfaces to correspond and connect with aeration supply holes 61 of the underlying structural support beam 60 (e.g. 60A). Because it is contemplated that deck plate 43 will be mounted over structural support beam 60 and beneath air headers 42, deck plate 43 must also be formed with aperatures corresponding to aeration inlet orifices 50 and aeration supply holes 61. The connection between structural support beam 60A and an air header 42 is best illustrated in FIG. 7, as is resilient seal 51 which preferably ensures a good seal between inlet orifice 50 and supply hole 61.

In particular, FIG. 7 shows an enlarged cross-sectional view of a portion of the floor structure of reactor 10, taken through support beam 60A and through its aeration supply holes 61.

Each air header 42 is further provided with a plurality of longitudinally spaced aeration outlet ports 47. While outlet ports 47 are shown as being formed in the lower surfaces of air headers 42 (FIG. 6), these ports can be formed in the top, side or bottom surfaces of a particular air header 42, as desired. In particular, it is preferred to form the outlet ports 47 on the lower surfaces of air headers 42 to minimize the potential of these ports becoming clogged with waste material being processed within reactor 10. Aeration gases are thereby supplied via the hollow structural support beams 60, through aeration supply hole 61 and inlet orifices 50, and through air headers 42 and outlet orifices 47 to the interior of chamber 15. It should be understood that while it is preferred to supply aeration via the structure described above, as will be seen with regard to an alternate embodiment described below, aeration may equally be provided via the side walls or via an intermediate wall (or central panel) of a composting reactor made in accordance herewith.

Figure 6:
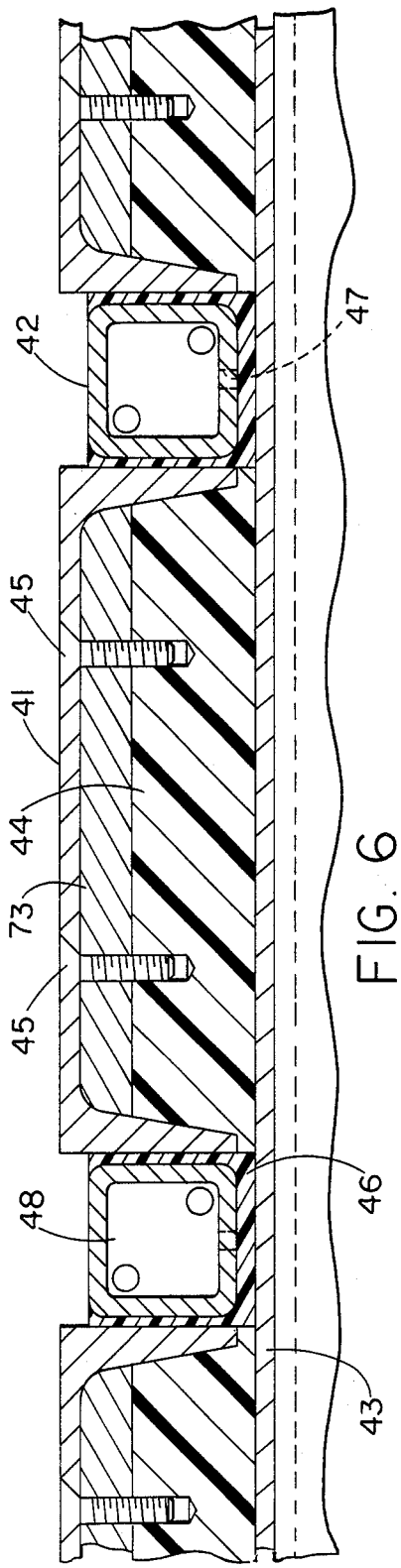
FIG. 6 is an enlarged cross-sectional view of the floor portion of the composting reactor taken along line 6—6 of FIG. 4.

As described above, it is preferred to provide reactor 10 with the flexibility of independently controlling various processing zones therewithin. As shown in FIG. 3, for example, a first zone "A" might be provided by air being supplied through hollow structural support beam 60A. A second zone "B" might similarly be provided by the supply of independently controlled aeration gases via the hollow structural support beam 60C. In order to maintain such zones substantially separate from one another, however, the individual air headers 42 must be provided with some type of sealing arrangement between the desired zones. In particular, as shown in FIGS. 5 and 6, a preferred manner of providing isolation between such zones includes zone plugs 48 within air headers 42 at the boundaries of each such zone, as well as providing seals 46 about the periphery of air headers 42 to minimize longitudinal migration of aeration gases from one zone to another. Zone plugs 48 can comprise any type of plug which can effectively seal the passageway within a continuous air header 42, for, alternatively, can comprise end plates sealing off the ends of individual sections of an air header 42 longitudinally placed in series along the length of chamber 15.

In most cases, individual air headers 42 will not be a continuous tube throughout the length of chamber 15, as these chambers can exceed lengths of 40 feet or more. While the end plates or zone plugs 48 prevent longitudinal migration of aeration gases within air headers 42, a seal/wearshoe or a header seal 46 is also included about the periphery of air headers 42 to prevent migration of gases outside of the header system. As shown in FIG. 6, it is preferred that seal 46 be utilized to effectively block the spaces about the sides and bottom surfaces of air headers 42 to prevent longitudinal migration of air thereby. Similarly, a sliding seal 44 is also preferably attached within each slat 41 at the longitudinal boundaries of such zones to minimize the longitudinal migration of aeration gases within slats 41 and/or past the lower edges thereof. Sliding seal 44 may be attached to slat 41 by any convenient method, such as by countersunk screws 45. As shown in FIG. 6, countersunk screws 45 can perform a double function of simultaneously attaching sliding seal 44, and attaching interlocking plate 73 to slat 41.

Both sliding seal 44 and the stationary air header seal 46 can preferably be formed of material such as high molecular weight polyethylene or the like. Sliding seal 44 will further provide a bearing surface for slats 41, and therefore, the material used for such seals should minimize friction at this point. It is contemplated that sliding seals (e.g. 44) can be utilized in combination with the roller supports (as described above) to provide a support system for slats 41 which minimizes friction. It should be understood that such sliding seals could further be utilized instead of such roller supports in some applications as the sole support. Alternatively, the roller supports might be utilized as the sole support in a particular application where sliding seals were not desired or needed.

In use, organic waste materials are placed within the reactor's chamber 15 via hopper 25 and entrance structure 22, and progressively moved at a relatively slow predetermined speed (as discussed, such movement can be substantially continuous or intermittent, as desired) therethrough by the reciprocating slat arrangement, as described above. It can be seen that the longitudinal reciprocation of slats 41 relative side walls 21 and 22, and relative the stationary interposed air headers 42 progressively and slowly moves (either substantially continously or intermittently, as appropriate) and organic waste material through chamber 15 without substantially compacting the waste material in the longitudinal direction. The aeration gases being injected via air headers 42 at varying rates of flow throughout the chamber length help to optimize the biological processes taking place within the reactor by ensuring that the biological culture therewithin is provided with constant new sources of food. By progressively moving the waste material through chamber 15 without substantially compressing the same, the subject reactor can more efficiently and more uniformly provide aeration through the organic waste throughout the process. This aeration is critical to ensuring optimum composting of the material within the reactor.

As described above, top wall 30 of chamber 15 is preferably provided with aeration exhaust structure 31 for properly withdrawing aeration gases and other biological reaction gases present in the reactor to ensure environmental safety and to maintain a predetermined flow of aeration gases through the system, as desired. It is preferred that aeration exhaust duct 31 be provided as part of the structural support members of top wall 30 (see FIG. 2), although such need not be the case. Exhaust duct 31 can simultaneously provide a condensate trough for withdrawing excess moisture and condensation from the system. The exhausted gases can be scrubbed, filtered and/or otherwise treated and discharged safely to the environment, or recycled into the system, as appropriate.

As also discussed above, it is preferred that reactor 10 comprise a plurality of zones which can be independently controlled to provide versatility and precise adjustability of the composting process of the subject reactor. As described above, the individual zones can be controlled by adjusting the temperature, humidity, gas components, and/or quantity of the aeration to effect the composting process as desired. For example, higher humidity may be required for certain organic wastes to provide more efficient composting. Aeration pressures could be independently supplied by individual compressors/blowers for each zone within chamber 15. Similarly, the walls of chamber 15 might further be supplemented with heating and/or cooling structures to precisely control temperatures within any particular zone. Low temperature in the first few zones, followed by higher temperatures in the latter zones might provide more efficient composting for certain organic matter. Various temperature and humidity monitoring and feedback equipment might preferably be located at strategic places within the system to facilitate control within particular zones; or, alternatively such monitoring and feedback equipment could be mounted on retractable structures (not shown) to provide intermittent sampling within reactor 10 while minimizing required intrusion into the interior thereof. Such retractable equipment might also facilitate product movement through reactor 10, and periodic cleanup procedures. Moreover, side walls 20 and 21, and top wall 30 might also be equipped with heat exchanging structure (e.g. air to air or air to water type) in order to harness excess heat from the composting mass, with such heat being utilized to supplement energy input into reactor 10 or for other non-related energy requirements. While it is contemplated that temperature can be controlled by the aeration gases alone in most cases, it may be preferred to augment this capability with such auxiliary temperature control system in some applications, and, possibly, incorporating time clocks and the like for additional predetermined control.

While overall size of an individual reactor made in accordance with the present invention is not critical and can vary substantially between particular applications, it is contemplated that the dimensions of chamber 15 of the subject reactor 10 shown and described herein might be approximately 40 feet long and approximately 10 feet square. It is further contemplated, however, that the composting reactor of the subject invention could also be manufactured in modular form such that a plurality of reactors 10 might be combined in seriatim for particular applications. In this way, several smaller units could be combined for a larger application, or a number of smaller units could be effectively portable such that large volume needs in a variety of locations could be handled by a single set of composting reactor modules.

Because mixing of the organic wastes is extremely critical to optimizing composting reactions for any organic matter, it is further contemplated that the horizontal, plug-flow composting reactor of the subject invention might also be augmented with additional mixing capabilities. Mixing and particle reduction facilitates the decomposition reactions which must take place during composting, and enhances the porosity of the organic matter. As used herein, the term "enhances" means that the porosity of the organic matter is improved such that air flow therethrough is facilitated. Enhanced porosity, in turn, enables far more uniform aeration of the organic matter, and helps optimize composting. In particular, especially in large volume applications where a plurality of reactors might be combined in series, it may be preferred to include an additional mixing device within the system.

As shown in FIG. 8, an example of the incorporation of an additional mixing device is shown as located between two modular composting reactors 100 effectively attached in series. The exact location of such mixing device could be modified as desired, and is shown in FIG. 8 in a preferred position for ease of assembly. Particularly, two modular composting reactors 100 could be manufactured without such additional mixing capabilities, and the additional mixer could itself be made as a modular unit (e.g. unit 90) easily adaptable to such reactors. The additional mixing device could comprise any apparatus capable of mixing the particular organic waste to be processed, such as a paddle type or flail mixer, a delumper device, an auger, or any similar device commonly available in the industry. A delumper 90 having a pair of spaced delumping cylinders 91 with a plurality of outwardly extending prongs 92 is shown in FIG. 8 as a preferred example. The addition of such mixing device would further augment the particle size reduction accomplished during the reaction process of the subject invention. It should be noted that a mixing device might also be placed at the entrance of a reactor 10 (as described with regard to FIG. 1), such as by arranging a horizontal delumper or auger mixer adjacent feed closure 22. Leveling screw 26 described above would serve to provide some such mixing. Additionally, it should be noted that a mixer/transport device (e.g. a screw feed transport apparatus) could be utilized to connect two modular composting reactors in a side-by-side relationship, where the above/below setup of FIG. 8 is not desired.

Figure 9:
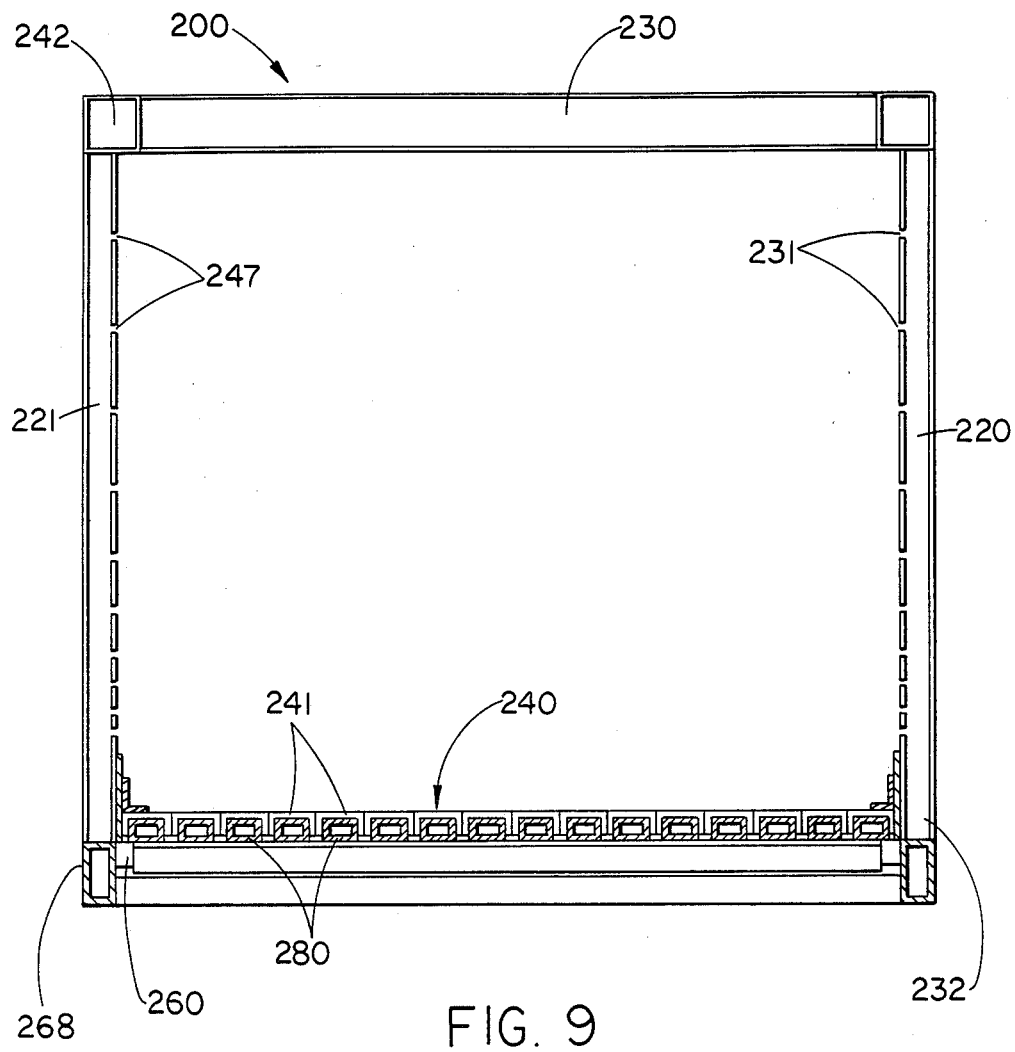
FIG. 9 is a cross-sectional end view of an alternate embodiment of a composting reactor made in accordance with the subject invention.

FIG. 9 illustrates an alternate embodiment of a composting reactor 200 in accordance herewith, and incorporating a slat-type conveyor bed 240 as is commonly available in the conveyor and unloading industry, such as from Keith Manufacturing Company of Madras, Oreg. In particular, slat conveyor bed 240 comprises a plurality of longitudinally reciprocable slats 241 arranged in side-by-side relationship and designed to be selectively reciprocated in the same manner described above with regard to slats 41. As shown, composting reactor 200 does not include the spaced air headers 42 as described above with regard to composting reactor 10. In this regard, it is contemplated that a substantially standard reciprocating conveyor, such as set forth in U.S. Pat. No. 4,144,963, which issued to O. Halstrom on Mar. 20, 1979, can be employed to provide the slat-type reciprocating conveyor floor of the subject invention. Slat-type conveyors available in the industry generally provide a substantially non-porous conveyor designed solely to move materials from one place to another therealong. Aeration could be supplied to reactor 200 by modifying the underlying stationary guide beams 280 to provide aeration in a manner similar to that described above with regard to the tubular structural support beams 60 and air headers 42 of reactor 10. More particularly, support beam 260 could be formed as a hollow member whereby air pressure could be supplied to guide beams 280. Longitudinal support beam 268 could also be provided as an air supply channel, placing support beam 260 in fluid communication with a source of pressurized air. If aeration were to be supplied in this manner, additional aeration nozzles would have to be formed either through the reciprocating slats, or the seals between such slats could be modified or removed to allow such aeration to enter reactor 200.

More preferably, however, when a standard slat-type conveyor system is to be used, aeration can be supplied without significantly modifying the conveyor bed itself. As shown in FIG. 9, aeration nozzles 247 may be formed in a side wall of the reactor (e.g. rear side wall 221) to provide aeration to the reactor. Aeration exhaust ports 231 can also be formed in an opposite side wall (e.g. front side wall 220) to draw the air supplied by aeration nozzles 247 through the organic wastes within reactor 200. Air pressure could be supplied to aeration nozzles 247 via any convenient supply conduit, such as hollow structural member 242 of top wall 230. A condensate drain 232 is also preferably included adjacent aeration exhaust ports 231 to collect and properly dispose of condensate extracted from the reactor. While it is believed that the most efficient manner of introducing aeration into the composting reactor of the subject invention is from the bottom (or floor area) to top, in order to take advantage of the natural tendency to flow along the path of least resistance, composting reactor 200 has been included to emphasize that there are many ways of arranging the aeration flow within such system. In particular, it may be preferred to utilize a standard slat-type conveyor system as shown in FIG. 9 for some smaller scale applications. It is contemplated that orifice control devices and/or strategic location of the orifices of aeration nozzles 247 could further be utilized in compost reactor 200 to better control or regulate the vertical distribution of air within such system. It is contemplated that a further alternative embodiment could be produced by removing several slats 241 from within compost reactor 200, and attaching a central vertical partition structure therewithin for either supplying or exhausting aeration therefrom. In such case, pressurized air could be supplied from the exterior wall portion 221 and 220, respectively, and exhausted through such central partition (not shown), or vice-versa. Such a modification would, in effect, produce two substantially mirror-image parallel reactors within the single reactor 200.

Various modifications of the described invention will be apparent to those skilled in the art. Examples of several such variations have been mentioned and discussed above. Other adaptions could be made by those of ordinary skill in the art without departing from the scope of this development. Accordingly, the scope of the present invention should be considered in terms of the following claims and it is understood not to be limited to the details of structure and operation described and shown in the specification and drawings.

What is claimed is:

1. A continuous plug-flow composting reactor for organic matter, said reactor comprising:
   (a) a longitudinal hollow chamber having a floor, a pair of oppositely disposed side walls, and a top wall;
   (b) said floor of said chamber further comprising a plurality of longitudinal slats slidably mounted for longitudinal reciprocation relative said side and top walls of said chamber and located in parallel relationship to one another along the longitudinal chamber;
   (c) means for providing aeration gases to the interior of said chamber;
   (d) means for exhausting said aeration gases from said chamber to ensure a predetermined flow of such gases through said chamber; and
   (e) means for selectively longitudinally reciprocating said slats within said chamber, thereby imposing movement of organic wastes through said reactor within said longitudinal chamber without substantially compressing the organic wastes.

2. The composting reactor of claim 1, wherein adjacent slats of said floor are laterally spaced from one another by interposed longitudinal aeration headers.

3. A continuous plug-flow composting reactor for organic matter, said reactor comprising:

(a) a longitudinal hollow chamber having a floor, a pair of oppositely disposed side walls, and a top wall;

(b) said floor of said chamber further comprising a plurality of longitudinal slats slidably mounted for longitudinal reciprocation relative said side and top walls of said chamber, said slats being located in parallel relationship to one another along the longitudinal chamber, with adjacent slats being laterally spaced from one another by interposed means for providing aeration gases to the interior of said chamber;

(c) means for exhausting said aeration gases from said chamber to ensure a predetermined flow of such gases through said chamber; and (d) means for selectively longitudinally reciprocating said slats within said chamber, thereby imposing movement of organic wastes through said reactor within said longitudinal chamber without substantially compressing the organic wastes.

4. The composting reactor of claim 3 wherein said chamber is effectively divided into a plurality of processing zones wherein said aeration provided can be independently controlled as desired.

5. The composting reactor of claim 4 wherein said zones within said chamber are effectively provided by aeration seals which substantially prevent longitudinal migration of aeration gases along said slats between adjacent zones.

6. The composting reactor of claim 5 wherein each said zone can effectively provide separate areas within the reactor wherein the internal temperature, moisture level, and the aeration of the organic waste can be individually controlled as desired.

7. The composting reactor of claim 3 further comprising additional means for actively mixing the organic matter to augment particle size reduction and enhance the porosity thereof.

8. The composting reactor of claim 3 wherein said means for exhausting said aeration gases includes an exhaust port located adjacent the top wall of said chamber to draw said aeration gases upwardly within said reactor through the organic matter.

9. The composting reactor of claim 3, said reactor further comprising structural support for said floor which includes at least one hollow support beam which also serves to place said interposed means for providing aeration gases in fluid communication with a source of pressurized aeration gases.

10. The composting reactor of claim 3 wherein said means for longitudinally reciprocating said slats comprises a fluid pressure driven device capable of simultaneously reciprocating a plurality of adjacent slats in the longitudinal direction of desired movement of the organic matter being processed, and sequentially retracting those adjacent slats in longitudinal direction opposite the direction of desired movement of the organic matter being processed.

11. The composting reactor of claim 10 wherein said fluid pressure device can be operated at a variety of speeds as desired.

12. The composting reactor of claim 3 wherein said slats are each slidingly mounted on at least one roller for longitudinal reciprocation within said chamber.

13. The composting reactor of claim 12, wherein said roller comprises a substantially free rolling structure confined within a predetermined rolling zone beneath a particular slat.

14. A continuous composting reactor for organic matter, said reactor comprising:

(a) a longitudinal hollow chamber having a floor, a pair of oppositely disposed side walls, and a top wall;

(b) an entrance structure and an exit structure located at opposite ends of said chamber, said entrance and exit structures substantially closing said reactor to the ambient when desired;

(c) said floor of said chamber further comprising a plurality of longitudinal slats slidably mounted for longitudinal reciprocation relative said side and top walls, said slats being located in parallel relationship to one another along their length, with adjacent slats being laterally spaced from one another by interposed aeration headers;

(d) means for exhausting aeration gases and reaction gases from said chamber, said means located adjacent said top wall to provide a flow of aeration gases from the lower portions of said chamber to the top thereof; and (e) means for selectively reciprocating said slats within said chamber to impose movement of organic matter through said reactor within said longitudinal chamber without substantially compressing the same.

15. The composting reactor of claim 14, said reactor further comprising structural support for said floor which includes at least one hollow support beam which also serves as a supply conduit of aeration gases to said aeration headers.

16. The composting reactor of claim 14 wherein said chamber is effectively divided into a plurality of processing zones wherein said aeration provided can be independently controlled as desired.

17. The composting reactor of claim 16 wherein said zones within said chamber are effectively provided by aeration seals which substantially prevent longitudinal migration of aeration gases along said slats between adjacent zones.

18. The composting reactor of claim 17 wherein each said zone can effectively provide separate areas within the reactor wherein the internal temperature, moisture level, and the aeration of the organic matter can be individually controlled as desired.

19. The composting reactor of claim 14 further comprising additional means for actively mixing the organic waste to augment particle size reduction thereof.

20. The composting reactor of claim 14 wherein said means for longitudinally reciprocating said slats comprises a fluid pressure driven device capable of simultaneously reciprocating a plurality of adjacent slats in the longitudinal direction of desired movement of the organic matter being processed, and sequentially retracting those adjacent slats in longitudinal direction opposite the direction of desired movement of the organic matter.

21. The composting reactor of claim 20 wherein said fluid pressure device can be operated at a variety of speeds as desired.

22. The composting reactor of claim 14 wherein said slats are each slidingly mounted on at least one roller for longitudinal reciprocation within said chamber.

23. The composting reactor of claim 22 wherein said roller comprises a substantially free rolling structure confined within a predetermined rolling zone beneath a particular slat.

24. A method for accelerating the composting of organic matter, comprising the steps of:
   (a) placing the organic matter within a reaction chamber, said chamber having a floor, a pair of oppositely disposed side walls, and a top wall;
   (b) moving the organic matter through said reaction chamber at a relatively slow predetermined speed by means of a flooring system within said reactor chamber comprising a plurality of longitudinal slats slidably mounted for longitudinal reciprocation therewithin, said longitudinal slats being selectively reciprocated to impose movement of the organic matter without substantially compressing the same;
   (c) aerating the organic matter within said chamber via aeration conduits; and
   (d) exhausting aeration and reaction gases from said reaction chamber, thereby ensuring a predetermined flow of aeration gases through the organic matter.

25. The method of claim 24 wherein said aerating step comprises a plurality of substantially separate aeration zones within said reaction chamber, whereby as organic matter is progressively moved through the chamber by the reciprocating floor system, the composting organic matter can be subjected to varying degrees of aeration, temperature and humidity.

26. The method of claim 24 further comprising the additional step of actively mixing the organic matter by passing said organic matter through a mixing device.

27. The method of claim 24 wherein said aerating step comprises subjecting the matter to a plurality of substantially separate aeration zones as it is progressively moved through the reaction chamber, wherein varying degrees of aeration, temperature and humidity can be provided in said separate aeration zones.

28. The method of claim 24, wherein said aeration gases are supplied via aeration conduits interposed between adjacent longitudinal slats in the chamber floor, and said gases are exhausted from the upper portions of said reaction chamber such that the predetermined flow of aeration gases is substantially vertically through the organic matter from the lower portions to the upper portions of said reaction chamber.

29. The method of claim 24, wherein said aeration gases are supplied via aeration nozzles in one or more of said side walls, and said gases are exhausted through exhaust ports laterally spaced from such aeration nozzles such that the predetermined flow of aeration gases is substantially horizontal through the organic matter.

* * * * *